United States Patent [19]

Remley et al.

[11] 3,907,039

[45] Sept. 23, 1975

[54] TURF EDGING APPARATUS FOR TRACTORS AND THE LIKE

[76] Inventors: Charles G. Remley, 4451 Fairview Dr., Toledo, Ohio 43612; Harold E. Thebeau, Rt. 1, Silica Rd., Sylvania, Ohio 43560; Raymond W. Medley, 1916 Price St., Toledo, Ohio 43605

[22] Filed: Oct. 5, 1973

[21] Appl. No.: 404,006

[52] U.S. Cl. .................................. 172/15; 56/256
[51] Int. Cl.² ........................................... A01G 3/06
[58] Field of Search ........................... 172/13–17, 172/181; 56/12.8, 13.3, 16.2, 256, DIG. 8

[56] References Cited
UNITED STATES PATENTS

| | | | |
|---|---|---|---|
| 2,561,882 | 7/1951 | Patton | 56/12.8 X |
| 2,630,052 | 3/1953 | Jory | 56/256 UX |
| 2,791,082 | 5/1957 | McDonough et al. | 56/256 X |
| 2,906,080 | 9/1959 | Light | 172/14 |
| 3,319,365 | 5/1967 | Perry et al. | 172/15 UX |
| 3,475,887 | 11/1969 | Price | 172/15 X |
| 3,665,687 | 5/1972 | Hatton | 56/DIG. 8 |

*Primary Examiner*—Edgar S. Burr
*Assistant Examiner*—Paul T. Sewell
*Attorney, Agent, or Firm*—Paul F. Stutz

[57] ABSTRACT

Multi-functional turf edging apparatus adapted for releasable securement to self-propelled tractors and the like, said apparatus including a principal frame releasably attachable to the underside of a standard tractor, an outrigger arm pivotably mounted on said frame, a freely rotatable disk carried dependingly from the outer end of said arm, said disk being shiftable between an operative turf edging "down" position and an inoperative "up" position, rotating brush means mounted rearwardly of said disk, and carried by said pivotable arm, said brush being adapted to sweep grass and turf left in the path of said disk as said apparatus is moving forwardly along with the tractor to which it is attached, blower means mounted on said frame rearwardly of said brush, said blower being situated and arranged to issue air in a path as to urge debris away therefrom, drive means carried on said apparatus adapted for connection with the power takeoff of said tractor or like apparatus, means for transmitting this power to said blower and said brush and a control for reciprocably pivoting said arm and disk either to the operative down position or the retracted up position.

12 Claims, 5 Drawing Figures connected to the chain and to rotor 10 and movable in response to vertical movement of the rotor to effect movement of valve shaft 186 of the servo valve.

I claim:

1. A soil working machine having a chassis on which traction wheels, an engine, and a soil stabilizer unit comprising a vertically movable rotor are mounted, said soil stabilizer unit further comprising a rotor support frame connected to said chassis and on which said rotor is mounted, hydraulic actuator means connected between said chassis and said rotor support frame for vertically moving said rotor, a hydraulic fluid source, a hydraulic pump driven by said engine for supplying fluid from said source to said actuator means, and depth control means for said actuator to locate and maintain said rotor at a predetermined depth, said depth control means comprising a servo valve located on said machine for controlling hydraulic fluid flow from said pump to said hydraulic actuator means, said servo valve having two independently movable valve control shafts, said depth control means further comprising manually operable adjustable means connected to one valve control shaft for controlling said hydraulic actuator means to locate said rotor at a predetermined depth, and further comprising mechanically operable adjustable means connected to the other valve control shaft and to said rotor and responsive to rotor position for maintaining said rotor at said predetermined depth.

2. A machine according to claim 1 wherein at least said other valve control shaft is rotatable, wherein said mechanically operable adjustable means comprises a first sprocket wheel on said other valve control shaft, a second sprocket wheel spaced from said first sprocket wheel and supported for rotation on said machine, an endless chain connected between said sprocket wheels, and a member connected between said chain and said rotor and movable in response to vertical movement of said rotor to effect movement of said chain and said other valve control shaft of said servo valve.

3. A machine according to claim 2 wherein said member is a flexible cable connected to and movable by said frame.

4. A self propelled soil stabilizing machine including a chassis, traction wheels mounted on the chassis, and a soil stabilizer unit operatively connected to the chassis, the stabilizer unit including a vertically movable rotor support frame, a rotor hood supported on the rotor support frame, a rotor mounted within the rotor hood, and actuator means operatively connected between the chassis and rotor support frame for vertically moving the rotor, the improvement comprising depth control means to locate and maintain the rotor at a predetermined depth, the depth control means comprising: a source of power on the soil stabilizing machine connected to operate the depth control means, a servomechanism on the soil stabilizing machine connected to control power flow from the source to the depth control means and having reference neutral position for controlling the actuator and thereby the position of the rotor to locate and maintain the rotor at the predetermined depth, the servomechanism having two independently operable control elements, first manually adjustable means operatively connected to one control element of the servomechanism to select the predetermined depth for the rotor, and second adjustable means operatively connected between the other control element of the servomechanism and the stabilizer unit, the second adjustable means being responsive to a change of the rotor position from the predetermined depth and effecting actuation of the actuator means for placing the servomechanism in its reference neutral position and thereby causing the rotor to be returned to the selected predetermined depth.

5. A machine according to claim 4 wherein said second adjustable means comprises mechanically operable means connected between the other control element and the rotor.

6. A machine according to claim 5 wherein the other control element is rotatable, wherein the mechanically operable second adjustable means comprises a first sprocket wheel on the other rotatable control element, a second sprocket wheel spaced from the first sprocket wheel and supported for rotation on said machine, an endless chain connected between both sprocket wheels, and a member connected between the chain and the rotor and movable in response to vertical movement of the rotor to effect movement of the chain and the other rotatable control element of the servomechanism.

7. A machine according to claim 6 wherein the member is a flexible cable connected to and movable by the rotor support frame.

* * * * *

TURF EDGING APPARATUS FOR TRACTORS AND THE LIKE

The present invention relates to a novel and utilitarian attachment type apparatus having particular utility in trimming or edging grass or turf which in its wild growth has overrun the marginal edges of man-made sidewalks, drives, patios, pathways and other areas desirably maintained or kept free of the grass, turf or, for that matter, even weeds or the like. In addition, the apparatus forms a groove or ditch in the earth or turf along the walkway. The apparatus is of particular utility in commercial or industrial grounds involving large tracts or acreage wherein this is a problem. Parks, cemeteries and like grounds, desirably maintained in an attractive and well groomed or manicured condition, are representative of the types of usages to which the attachment apparatus of the present invention is especially designed and will find widest acceptance.

The average homeowner would not find this apparatus, at least as described and illustrated herein, ideally suited for the typical lawn or yard associated with the average house or residence, albeit the apparatus would work and certainly a scaled down, smaller version could be employed by organizations who do residential lawn care on a commercial basis.

Commercial grass cutting equipment, of course, is well known and various lawn or grass cutting devices are on the market which make the maintenance of the acreage of turf or grass a manageable task. Unfortunately, to the present time, the manicuring, trimming or edging of the turf where, as indicated, it normally contacts and overruns sidewalks, driveways, etc., has presented time and labor consuming efforts. Most usually, the task is performed by hand or with electrically driven disks carried at the end of a hand-held wand.

It is an object of the present invention to provide an apparatus in the nature of an attachment for a tractor or tractor-like utility vehicle normally found and utilized by operators and users of the industrial or estate sized grass cutting equipment.

Industrial or estate sized grass cutting equipment frequently consists of a large plurality of individual reel-type cutter devices harnessed in "gang" fashion, e.g., in staggered spaced array, and pulled by a tractor or utility vehicle. Small versions of conventional farm tractors or mini-tractors are manufactured and sold as utility vehicles. Examples include the "Farmall" and the "Cub"; both of which are manufactured by International Harvester Company. These mini-tractors or "cub" tractors are generally engine propelled, four-wheel vehicles which, as indicated, resemble a tractor. They feature small front wheels and large rear drive wheels; the engine and transmission being designed for heavy duty, slow speed work as opposed to high speed highway performance. These utility cub-type tractors also include an engine driven power takeoff arrangement situated usually at the rear to which auxiliary equipment can be operatively connected, deriving thereby their power from the transmission of the running engine of the tractor.

It is a particular object of the present invention to provide an apparatus which (1) is self-contained, (2) is conveniently releasably attachable to the small tractors of the Farmall or Cub type and (3) features a depending, freely rotatable disk adapted to have its cutting edge move proximate the marginal edge of the driveway, etc., concerned, thereby removing wild grass and creating a minor trench, if you will, at the juncture of the driveway, etc., and the contiguous grass.

It is another object of the present invention to provide an attachment apparatus of the type described which features a pivotable outrigger arm for carrying said disk in either of two positions; an operative down position and an inoperative retracted or up position.

It is yet another object of the present invention to provide an apparatus of the character described which includes a cushion or shock absorber insulating the tractor from shock attendant accidental contact of the disk with an obstruction in its path such as rocks, pipes, tree roots or an irregular expansion joint in the concrete forming the curb or edge being trimmed or manicured.

It is likewise an object of the present invention to provide an apparatus of the character described which desirably includes auxiliary units for removing or cleaning debris created by the edging or trimming operation from the drive or walk, etc.

The foregoing and, as well, other objects of the present invention will become apparent to those skilled in the art from the following detailed description taken in conjunction with the annexed sheets of drawings on which there is presented, for purposes of illustration only, a single embodiment of the present invention.

IN THE DRAWINGS:

FIG. 1 is a three-quarter perspective view of the overall apparatus of the present invention shown in full line generally dirigibly carried beneath a tractor, illustrated in dotted outline, and with the principal pivot arm and cutting disk extending laterally in outrigger fashion beyond the tractor wheels;

FIG. 2 is a sectional view taken on the line 2—2 of FIG. 1 and illustrating the structure of the shock-absorbing assembly of the apparatus of the present invention and showing the relationship of the component parts thereof with the cutting unit in the retracted or inoperative fully up position;

Figure 4:
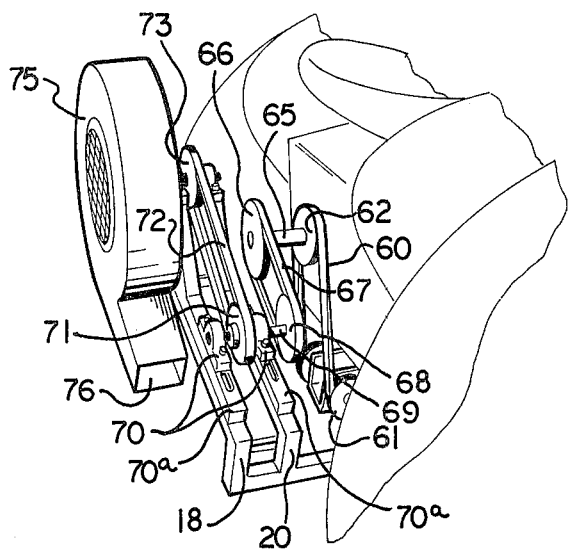
Figure 5:
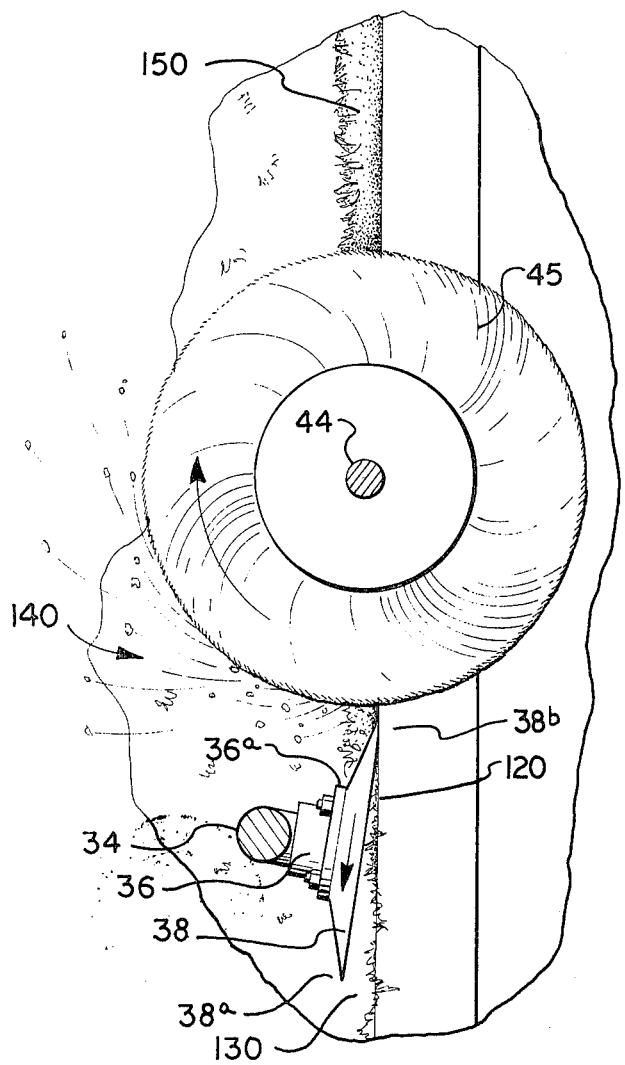

FIG. 4 is a perspective view looking down at an angle to the rear or aft portion of the apparatus in order to illustrate the power takeoff and drive transmission arrangement for certain auxiliary components of the present invention; and FIG. 5 is a top plan view of the cutting disk and the rotating brush, serving to illustrate the trimming of the grass along the marginal edge of a curb and formation of a small trench.

In accordance with one embodiment, the present invention contemplates an apparatus which is adapted to be releasably secured to a small tractor and comprising a main frame suspended dirigibly beneath the tractor, a laterally extending or outrigger arm pivotably carried thereon, a fully rotatable disk carried dependingly at the extremity of said pivot arm, a shock absorber assembly adapted to cushion said arm and frame when the disk hits an obstruction, a rotatable brush also mounted on said pivot arm and a blower unit conveniently carried on the rear of the frame, a power transmission means for rotating the rotatable brush and a blower from a single source of power; namely, the "power takeoff" at the rear of the tractor.

Referring now more specifically to the drawings, the tractor is identified by the reference numeral 11 in FIG. 1. As can be seen, it features the usual smaller front wheels, larger drive rear wheels and a rather large engine compartment. The overall apparatus 12 of the present invention is shown in solid outline, with the exception of several V or drive belts which are shown in dotted outline for simplicity and clarity of illustration. It is composed of elongate spaced parallel side rails 14 and 16 which extend from the front of the tractor to the rear. A pair of inverted, U-shaped, side-by-side channels 18 and 20 transversely connect the side rails 14 and 16 at the aft end, providing a raised platform for a blower auxiliary component, as will be later described.

The fore end of the rails 14 and 16 are connected by a U-shaped member 22 having a lower horizontal segment 22a horizontally spanning the distance between the side rails and upstanding legs 22b and 22c; the member 22 being welded to the rails. A similar single upstanding leg 23 is welded to side rail 14 about a third of the way back. Reference numeral 24 identifies two upstanding "ears" welded to rails 14 and 16 approximately three-fourths of the way to the rear. Each of the ears 24, the vertical leg 23 and the legs 22b and 22c have holes in their uppermost extremity which are releasably engageable with pins (not shown) extending from appropriate locations on the under carriage of the chassis of the tractor, serving thereby to support the entire frame 22 on which are mounted the various components which make up the apparatus.

Reference numeral 25 identifies a transverse frame member integrally secured by welding or suitable nuts and bolts to the side rails 14 and 16. The lateral frame member is bifurcated and includes spaced horizontal legs 25a and 25b. The legs 25a and 25b extend laterally to the right of the tractor beyond the right side rail 14 and connect with a rectangular vertically elongate guide 27 featuring a vertically elongate central slot or guideway 27a. Pivotably pinned, as at 25c, between the legs 25a and 25b of transverse member 25 is a pivot or outrigger arm 30 which extends through the slot or guideway 27a and beyond the tires (shown in dotted outline) of the tractor. Pivot arm 30 carries, bolted to its outer terminal extremity, a bifurcated shoe 32 bearing an outer plate 33. The outer planar surface of the plate has clamped thereto a vertically adjustable shaft 34 by releasable U-clamps 33a and 33b. The shaft 34 is bent at the bottom, as at 34a, to form an axle for a journal bearing and bracket member 36 having a circular flange 36a to which is bolted a disk 38. The disk, shown both in solid outline in the up or retracted position and in dotted outline in the operative down position, has a tapered edge for cutting the turf as described hereinafter. The pivot arm 30 extends from pivot point 25c, as indicated, through slot 27a and outwardly in outrigger fashion, carrying the depending disk in the manner previously described.

The particular operation of the outrigger or pivot arm 30 and the depending disk will be described hereinafter following the description of the other features of structure involved.

A bracket 42 is welded to the outrigger arm 30 and extends to the rear of the tractor just inwardly from the bifurcated shoe 32. The bracket has mounted thereon, in appropriate rotatable journals (not shown), a vertically depending shaft 44 having at its lowermost extremity a rotary brush 45. A pulley 46 is secured to the shaft 44 at its upper end by appropriate set screw. Belt 49 about pulley 46 connects with pulley 50, mounted on shoulder bolt 48, upstanding from plate 47, welded to arm 30. A pulley 51 similar to pulley 50 is mounted on the same shoulder bolt 48. Belt 52 connects pulley 51 with pulley 53. Pulley 53 together with pulley 54 are coaxially mounted like the pulley pair 50/51 but pulleys 53 and 54 are mounted on bracket arm 55 which is welded to the outrigger arm 30 just outwardly from the pivot connection 25c.

From the foregoing, it can be seen that the pulley sets 53/54 carried on bracket arm 55, the pulley sets 50/51 mounted on support 47 and pulley 46 mounted on bracket 42 are all actually carried by and pivot along with arm 30. These pulleys as described define a belt drive for rotating the brush 45. Pulley 54 is rotated by endless belt 60 which extends from pulley 54 about pulley 61, pulley 62, thence to pulley 63 and returning to pulley 54. See FIG. 4 for clearer view of the pulleys just mentioned. Pulley 62 is mounted on power takeoff shaft 65 extending from the rear end of the tractor, as shown. Also mounted on takeoff shaft 65 and coaxial with pulley 62 is pulley 66. Belt 67 connects pulley 66 with pulley 68 which is keyed to shaft 69, mounted in journals 70. Pulley 71 which is also mounted on shaft 69 is connected by belt 72 with pulley 73 which is keyed to a shaft not shown but serving to rotate an impeller inside of blower housing 75. The housing 75 includes an outlet 76. The power from the takeoff shaft 65 is thus transmitted via the array of pulleys and belts to the blower 75. The journals 70 are mounted in slotted support 70a, in turn mounted on top of the channels 18 and 20 which connect the side rails 14 and 16. The slides 70a permit the journal bearing 70 to be moved laterally whereby the belts and blower drive arrangement can be shifted transversely as desired to meet the particular condition as encountered.

The upward and downward pivotal movement of the outrigger arm 30 is accomplished in a manner and through an assembly of components and mounting arrangements as will now be described. Basically, the driver controls the movement by actuation of a two-position switch from the operator station which in turn actuates a hydraulic cylinder 80 which is shown in dotted outline as it actually represents an existing accessory furnished with the tractor. The hydraulic cylinder moves shaft 81 sequentially forwardly and rearwardly with respect to the tractor axis and through the clevis 82 translates this axial to and fro movement via crank arm 83 to horizontal shaft 84 which extends transversely of the tractor and terminates on the left-hand side of the tractor in a V-shaped crank or rocker arm 86 and, at the other end, on the right-hand side of the tractor, with a similar crank or rocker arm 87. The crank or rocker arms 86 and 87 each exhibit a crank or rocking action responsive to actuation of the hydraulic cylinder. The rocker arm 87 has a connector arm consisting of a tail extension 88, terminating in an apertured plate 89 (see FIG. 2). A shaft 90 extends vertically through the hole in the plate 89 and is anchored in a channel 91, welded to the outrigger pivot arm 30. The anchor takes the form of an enlargement 90a which will not pass upwardly through the aperture 91a in channel 91. A spring 93 encircles shaft 90. A collar 94 encircles shaft 90 and is secured thereto by Allen head set screw 95. Just beneath the collar 94 (as shown in FIG. 2) is a ball 97 which seats, as shown, on the plate 89.

Figure 3:
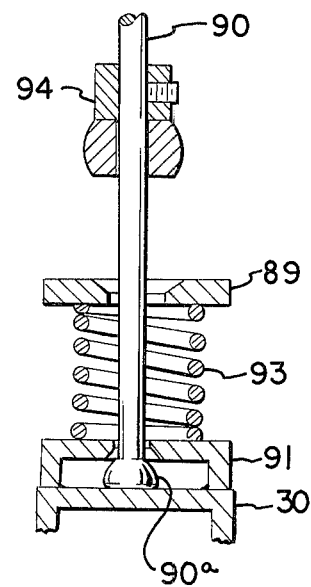
FIG. 3 is a view similar to FIG. 2 but showing the relationship of the component parts of the shock-absorbing assembly with the outrigger and cutting disk component of the present invention in the operative edge of trench-forming down position.

It is the just-described assembly of FIG. 2 which provides the cushioning safety feature of the present invention and also serves to translate the movement of crank arm 87 into upwardly and downwardly movement of the outrigger arm 30. As shown in FIG. 2, the outrigger lever arm 30 is in the "up" up position. This is determined by the fact that the crank arm 87 has been cranked clockwise (viewing FIG. 1), causing the extension 88 and plate 89 to move upwardly, whereby the ball 97 exerts upward force on collar 94, secured to shaft 90, thereby causing shaft 90 to move up. The movement of the shaft 90 upwardly pulls the arm 30 upwardly as the enlargement 90a hits the roof of channel 91. In this up position, the spring 93 is neither in tension or compression. In this regard, reference should be had to FIG. 3 which represents the relative relationship of the same component parts with the lever arm 30 in the down position. Assuming the down position, the crank or rocker arm 87 has moved counterclockwise, whereby the extension 88 and plate 89 moves downwardly, compressing the spring 93. In this position, the spring 93 is slightly in compression between the top of the channel 91 welded to the outrigger arm 30 and the plate 89 which, as indicated, is part of the extension 88, integrally a part of the crank or rocker arm 87. In this position, the disk perimeter, particularly the lower edge, is desirably an inch or so beneath the level of the ground surface or, in other words, is such as to define the depth of the trench desirably formed. Should the disk encounter an obstacle, the disk will transmit this shock upwardly through the axle 34a, to the vertical shaft 34 and thence through the shoe 32 to the outrigger arm 30. Resistance to movement of the outrigger arm 30 upwardly is provided by the compressed spring 93 between, as indicated, the upper surface of channel 91 and the bottom surface of plate 89 connected to extension 88.

Elevation of the outrigger arm 30 is effected simply by the operator actuating the appropriate control switch described earlier which will cause the hydraulic cylinder 80 to urge piston 81 forwardly, cranking the shaft 84 and the crank arms 86 and 87 forward and thereby raising the extension 88, plate 89 and consequently urging the lever arm 30 upwards as described earlier. The weight of the outrigger lever arm 30 is, in part, overcome by the spring-loaded L-shaped arm 100 on the left or port side of the tractor. The sorter leg 101 of the member 100 is connected, as shown, to the crank arm 86, while the upper end of arm 100 is connected to a spring 102, anchored in side rail frame member 16. This spring is tensioned to urge movement of the arm 100 into the position shown in solid outline; thus counter-balancing the weight of the outrigger arm 30 on the other side. In lowering the outrigger arm, actuation of the hydraulic cylinder 80 causes the piston shaft 81 to move rearwardly, cranking or rotating shaft 84 in the appropriate counterclockwise direction as causes the arm 100 to move to the rear into the dotted line position identified by the reference numeral 101. This, of course, elongates the spring 102 to an even greater extent than in the position shown in solid outline. Simultaneously with the movement of the L-shaped arm 100, of course, the crank or rocker arm 87 moves, lowering the plate 89 and allowing the shaft, particularly the enlarged portion 90a, to move downwardly, carrying the channel 91 and consequently the arm 30 to its desired position with respect to the ground. The height can be adjusted, of course, by the appropriate setting of the collar on the shaft 90.

It is a desirable feature of the present invention that the support and cushion assembly (FIGS. 2 and 3) provides for the spring 93 to be slightly in compression when the disk is in its operative down position and in contact with the turf. In this state of compression, the spring is capable of absorbing the shock attendant contact of the disk with an obstruction from the remainder of the apparatus. Without the support feature of the present invention, the pivot connection, as at 25c, would be subjected to considerable shock and breakage. Furthermore, the shock would cause a gradual deterioration in the control feature which operates retraction of the outrigger arm 30.

Reference to FIG. 5 reveals the proper attitude of the disk with respect to the edge, e.g., curb, being trimmed. The tractor is moving in the direction of the arrow superimposed on the disk and, of course, the disk is likewise moving in the same direction. The disk, as indicated, is desirably mounted through appropriate attitude of shaft 34 mounted in the U-clamps 33a and 33b (see FIG. 1) such that the trailing edge 38b, rather than the forward edge 38a, is moving in this closest proximity to the edge of the curb 120. Forward of the disk is a region 130 which represents untrimmed region along the interface between the grass or turf and curb. As the disk passes, dirt, weeds and turf are uprooted and thrown laterally, as indicated by the reference numeral 140, leaving in the rear a neatly furrowed trench 150. In the movement of the disk, of course, certain amount of debris is normally randomly thrown. The brush 45 mounted rotation just aft or rearwardly of the disk sweeps and urges the upward debris laterally away from the curb, as shown in FIG. 5.

Turning now again to FIG. 1, it will be appreciated that as the tractor moves, the outrigger mounted disk is the first implement to contact the turf along the region of wild growth. This is followed by the rotating brush and thence just in back of the brush by a constant stream of air issuing from the blower; specifically, transverse blast of air from its mouth or exit 76. As the unit passes, the edge of the drive or walk is characterized by a neatly manicured furrow or ditch alongside the edge of the curb or driveway, as the case may be, and also by a surface of the drive or walk which is free of debris.

Modifications may be resorted to without departing from the spirit and scope of the invention as defined in the following claims.

I claim:

1. Apparatus for trimming and removing turf, grass, etc., along the margin of drives, walks, curbs and the like, said apparatus being adapted to be removably carried by a self-propelled vehicle such as a tractor, said apparatus including:
   1. a frame including spaced means for releasable securement to said tractor,
   2. a pivot arm carried by and pivotably secured to said frame on a pivot axis which is parallel to the path of said vehicle, said arm being constructed and arranged to extend laterally outwardly from said frame, 3. a freely rotatable disk carried dependingly on said arm, with the central plane of said disk vertically disposed, and,
4. means for supporting said pivot arm, said means providing vertically pivoting movement of said pivot arm about said pivot axis between an upper position wherein said disk is out of contact with the ground and a lower operative position wherein the disk is at least ground level, said means including a vertically compressible spring constructed and arranged to be in compression when said pivot arm is in the lower operative position, said spring serving to absorb shock caused by contact of said disk with any obstruction in its path and transmitted to said pivot arm and thence to said spring.

2. Apparatus as claimed in claim 1 which includes means for pivoting said pivot arm between said upper and lower positions.

3. Apparatus as claimed in claim 2 wherein said pivoting means includes a crank arm connected to said pivot arm and means for moving said crank arm between two positions.

4. Apparatus as claimed in claim 1, wherein said tractor includes a power takeoff shaft and wherein said removable apparatus includes a brush rotatable about a vertical shaft mounted on said pivot arm at the rear of said disk, a belt and pulley power transfer array which extends from said shaft laterally to that portion of the frame just rearwardly of the pivot arm pivotable connection to said frame and thence rearwardly to said power takeoff shaft, said array being suitably connected by belts transmitting rotation of said power takeoff shaft to said vertical brush shaft.

5. Apparatus as claimed in claim 1, wherein said support means includes a shaft projecting upwardly from said pivot arm, a connector arm adjustably contacting said vertically upstanding shaft, a spring encircling said shaft located between the pivot arm and the connector arm and movable stop means on the upper end of said shaft providing said adjustability, said connector arm being connected to a rocker arm carried by said tractor and being shiftable between at least two positions, whereby operator actuation of said rocker arm is translated to upward or downward movement of said pivot arm.

6. Apparatus for trimming and removing turf, grass, etc, along the margin of drives, walks, curbs and the like, said apparatus being adapted to be removably carried by a self-propelled vehicle such as a tractor, said tractor including a crank arm shiftable between at least two positions, said apparatus including:
  1. a frame including means for releasable connection witht the under carriage of said tractor,
  2. a pivot arm pivotably secured to said frame and extending laterally outwardly from said frame,
  3. a vertically depending, freely rotatable disk carried by said pivot arm, said disk being vertically disposed,
  4. a shaft projecting upwardly from said pivot arm proximate said crank arm and
  5. means including a connector arm adjustably and releasably secured to said shaft, said connector arm being connected to said crank arm, whereby actuation of said crank arm in the appropriate direction lifts or lowers said shaft and consequently said pivot arm and disk.

7. Apparatus as claimed in claim 6 which includes a spring situated between said pivot arm and said connector arm, said spring being in compression when said pivot arm is in its lower position.

8. Apparatus as claimed in claim 6 in which said tractor includes a second crank arm, said second crank arm being connected to said first crank arm, and wherein said apparatus further comprises:
  an elongate balance arm connected to said second crank arm and
  a tension spring connected to said balance arm and anchored as to urge said balance arm and crank arms in a direction normally urging said pivot arm upwardly whereby said disk is not in contact with the ground.

9. Apparatus as claimed in claim 8, wherein said second crank arm and said crank arm are mounted coaxially on opposite ends of a horizontally disposed crank shaft, said shaft being oscillatable responsive to actuation of a hydraulic cylinder carried on said tractor.

10. Apparatus as claimed in claim 1 which includes a vertically depending rotatable shaft mounted for rotation on said pivot arm to the rear and slightly inwardly with respect to the normal forward movement of said tractor and disk, a first pulley on said shaft for rotating said shaft, a brush carried at the lower extremity of said shaft vertically adjusted to contact the surface of the drive or the like when the pivot arm is in its lower position, means for rotating said first pulley, said means including an array of pulleys and belts extending from said first pulley to a pair of horizontally disposed coaxial transfer pulleys on the inner extremity of said pivot arm but rearwardly thereof with respect to the tractor, a drive pulley mounted on the power takeoff extending horizontally rearwardly from said tractor, a pair of coaxially but independently oppositely rotatable vertical idler pulleys located or mounted beneath said drive pulley and an endless belt extending about the drive pulley, one idler transfer pulley, one of said pulleys, about said second idler pulley and thence to said drive pulley, whereby rotation of said drive pulley is translated to said brush.

11. Apparatus for trimming and removing turf, grass, etc., along the margin of drives, walks, curbs and the like, said apparatus being adapted to be removably carried by a self-propelled vehicle such as a tractor, said tractor including (a) crank arm simutaneously shiftable between at least two positions, (b) a rearwardly extending power rotatable takeoff shaft and (c) a hydraulic cylinder accesory adapted to shift said crank arms, said apparatus including:
  1. a frame including means for releasable connection with the under carriage of said tractor,
  2. a pivot arm pivotably secured to said frame and extending laterally outwardly from said frame,
  3. a vertically depending, freely rotatable disk carried by said pivot arm, said disk rotating in a vertical plane,
  4. a shaft projecting upwardly from said pivot arm proximate said crank arm,
  5. means including a connector arm adjustably and releasably secured to said shaft, said connector arm being connected to one said crank arms, whereby actuation of said crank arm in the appropriate direction lifts or lowers said shaft and consequently said pivot arm and disk,
  6. brush means mounted dependingly on said pivot arm and located rearwardly of the path of said disk,
7. means connecting said brush means to said rearwardly extending power takeoff means,
8. blower means mounted on said frame rearwardly of said brush means and located to issue a stream of air transversely to the path of said disk and brush,
9. means connecting said blower means to said rearwardly wxtending power takeoff shaft,
10. an elongate balance arm connected to the other of said crank arms and 11. a tension spring connected to said balance arm and anchored as to urge said balance arm and crank arms in the direction normally urging said pivot arm upwardly whereby said disk is not in contact with the ground.

12. Apparatus as claimed in claim 6 which includes a guide member secured to said frame, said guide being located outwardly from said pivot arm securement on said frame and including a vertically elongate slot or guideway through which said pivot arm extends.

* * * * *